United States Patent
van der Straten et al.

(10) Patent No.: US 11,791,290 B2
(45) Date of Patent: Oct. 17, 2023

(54) PHYSICAL UNCLONABLE FUNCTION FOR SECURE INTEGRATED HARDWARE SYSTEMS

(71) Applicant: International Business Machines Corporation, Armonk, NY (US)

(72) Inventors: Oscar van der Straten, Guilderland Center, NY (US); Koichi Motoyama, Clifton Park, NY (US); Ruilong Xie, Niskayuna, NY (US); Alexander Reznicek, Troy, NY (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 17/362,149

(22) Filed: Jun. 29, 2021

(65) Prior Publication Data

US 2022/0415826 A1    Dec. 29, 2022

(51) Int. Cl.
*H01L 23/00* (2006.01)
*H01L 21/768* (2006.01)
*H01L 23/528* (2006.01)

(52) U.S. Cl.
CPC ...... *H01L 23/573* (2013.01); *H01L 21/76843* (2013.01); *H01L 21/76877* (2013.01); *H01L 23/528* (2013.01)

(58) Field of Classification Search
CPC ............. H01L 23/573; H01L 21/76843; H01L 21/76877; H01L 23/528; H01L 21/7682; H10B 61/00; H10B 63/80; H10B 53/00
See application file for complete search history.

(56) References Cited

U.S. PATENT DOCUMENTS

| | | |
|---|---|---|
| 8,253,568 B2 | 8/2012 | Choi |
| 8,759,976 B2 | 6/2014 | Edelstein et al. |
| 8,803,328 B1 | 8/2014 | Song et al. |
| 9,397,826 B2 | 7/2016 | Kim et al. |
| 9,502,405 B1 | 11/2016 | Cao et al. |
| 9,666,582 B1 | 5/2017 | Li et al. |
| 10,848,328 B2 | 11/2020 | Kim et al. |
| 10,957,586 B2 | 3/2021 | Cao et al. |
| 10,958,451 B2 | 3/2021 | Kim et al. |
| 2014/0183741 A1 | 7/2014 | Park |
| 2017/0077046 A1 | 3/2017 | Gupta et al. |
| 2018/0375670 A1 | 12/2018 | May et al. |
| 2021/0091014 A1 | 3/2021 | Charpin-Nicolle et al. |

*Primary Examiner* — Robert G Bachner
(74) *Attorney, Agent, or Firm* — Scully, Scott, Murphy & Presser, P.C.; Samuel Waldbaum (57) ABSTRACT

An integrated circuit (IC) is provided that includes a plurality of physical unclonable function (PUF) structures located in a PUF area. Each PUF structure of the plurality of PUF structures includes at least a PUF top electrically conductive structure containing random sidewall voids and random line openings which can provide an encrypted security code to the IC. The IC further includes a plurality of memory structures located in a memory area that is located laterally adjacent to the PUF area. Each memory structure of the plurality of memory structures includes a memory element sandwiched between a bottom electrically conductive structure and a top electrically conductive structure. The top electrically conductive structures are devoid of sidewall voids and line openings.

20 Claims, 6 Drawing Sheets

PHYSICAL UNCLONABLE FUNCTION FOR SECURE INTEGRATED HARDWARE SYSTEMS

BACKGROUND

The present application relates to semiconductor technology, and more particularly to an integrated circuit (IC) including a plurality of memory structures located in a memory area that is located laterally adjacent to a physical unclonable function (PUF) area containing a plurality of PUF structures.

A physical unclonable function (sometimes also called physically unclonable function) or PUF, is a physically defined "digital fingerprint" that serves as a unique identity for a semiconductor device such as a microprocessor. Physical unclonable functions are based on unique physical variations which occur naturally during semiconductor manufacturing. A physical unclonable function is a physical entity embodied in a physical structure. Today, physical unclonable functions are usually implemented in integrated circuits and are typically used in applications with high security requirements.

Security is critical to today's interconnected world, and hardware protection is equally important as security at the network and system levels. Silicon-based physical unclonable functions are increasingly used as a hardware root of trust and an entropy source for cryptography applications. In those applications, the reliability of the physical unclonable function output is a key to successful implementation. Both weak and strong physical unclonable functions obtain output by amplifying analog signals from physical properties on the integrated circuit blocks (e.g., propagation delay, ring oscillator, time-controlled oxide breakdown or threshold voltage SRAM transistors). These physical measurements are made by nature sensitive to environmental conditions, such as, for example, temperature, operating voltage, thermal/interface noise of transistors, process corners and aging.

As a result, it is difficult to obtain a stable physical unclonable function output without taking additional stabilization and error-corrections techniques, e.g., temporal majority voting, pre-burning on physical unclonable function bits for end-of-the-life prediction and reliability screening, masking algorithms, as well as leveraging parity bits for an Error-Correcting-Code (ECC), into consideration.

A physical unclonable function is needed which is compatible with existing interconnect technologies, does not require an additional mask and/or processes, and is reliable and not easily influenced by temperature.

SUMMARY

In one aspect of the present application, an IC is provided that includes a plurality of PUF structures located in a PUF area, wherein each PUF structure of the plurality of PUF structures comprises at least a PUF top electrically conductive structure containing random sidewall voids and random line openings. The IC further includes a plurality of memory structures located in a memory area that is located laterally adjacent to the PUF area. Each memory structure of the plurality of memory structures comprises a memory element sandwiched between a bottom electrically conductive structure and a top electrically conductive structure, wherein the top electrically conductive structure in the memory area is devoid of sidewall voids and line openings.

In another aspect of the present application, a method of forming an IC is provided. In one embodiment, the method includes forming an interconnect structure comprising a stack of a first interconnect dielectric material layer, a second interconnect dielectric material layer and a third interconnect dielectric material layer, wherein the stack includes a PUF area and a memory area, wherein the memory area includes a bottom electrically conductive structure embedded in the first interconnect dielectric material layer and a plurality of memory elements embedded in the second interconnect dielectric material layer. Next, openings are formed in the third interconnect dielectric material layer and in both the PUF area and the memory area, wherein each of the openings formed in the PUF area have a first critical dimension and each of the openings forming in the memory area have a second critical dimension that is greater than the first critical dimension. After formation of the openings, a diffusion barrier layer is formed in each of the PUF area and the memory area, wherein the diffusion barrier layer that is formed in the PUF area is a discontinuous layer of diffusion barrier material that is formed on a topmost surface of the third interconnect dielectric material layer and along a bottom of each of the openings having the first critical dimension and the diffusion barrier layer that is formed in the memory area is a continuous layer of diffusion barrier material that is formed on the topmost surface of the third interconnect dielectric material layer and along a sidewall and bottom of each of the openings having the second critical dimension. Next, a top electronically conductive structure is formed in each of the openings by deposition of a conductive material and a material removal process, wherein the material removal process removes the discontinuous layer of diffusion barrier material and the continuous layer of diffusion barrier material that are located on the topmost surface of the third interconnect dielectric material layer, wherein the top electrically conductive structure that is present in the openings having the first critical dimension are PUF top electrically conductive structures that contain random sidewall voids and random line openings.

DETAILED DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Figure 1A:
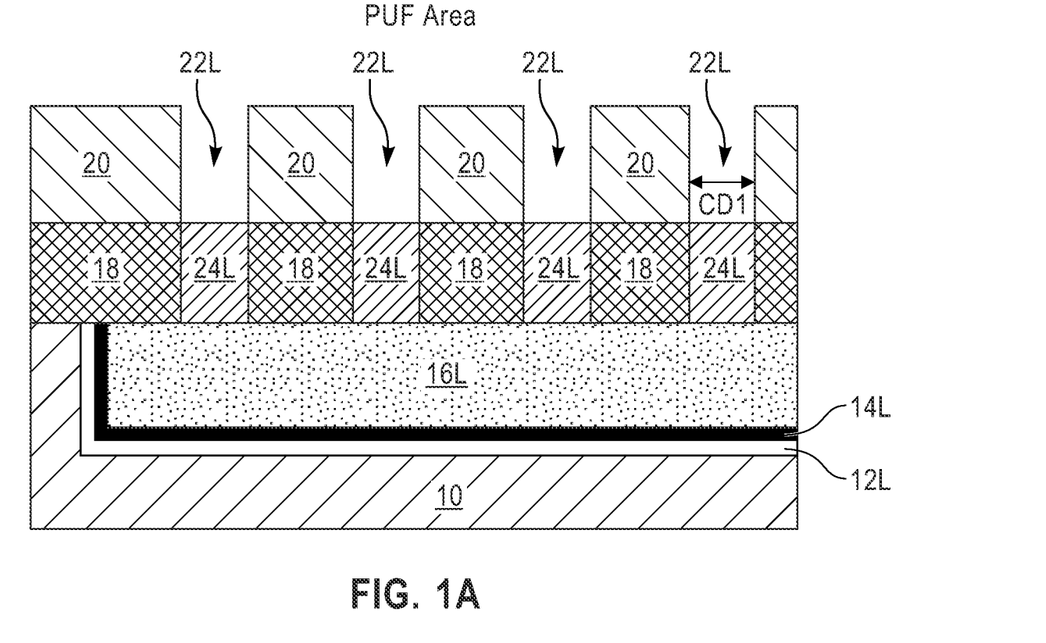
FIG. 1A is a cross sectional view illustrating a PUF area of an interconnect structure after forming openings into a third interconnect dielectric material layer.
Figure 1B:
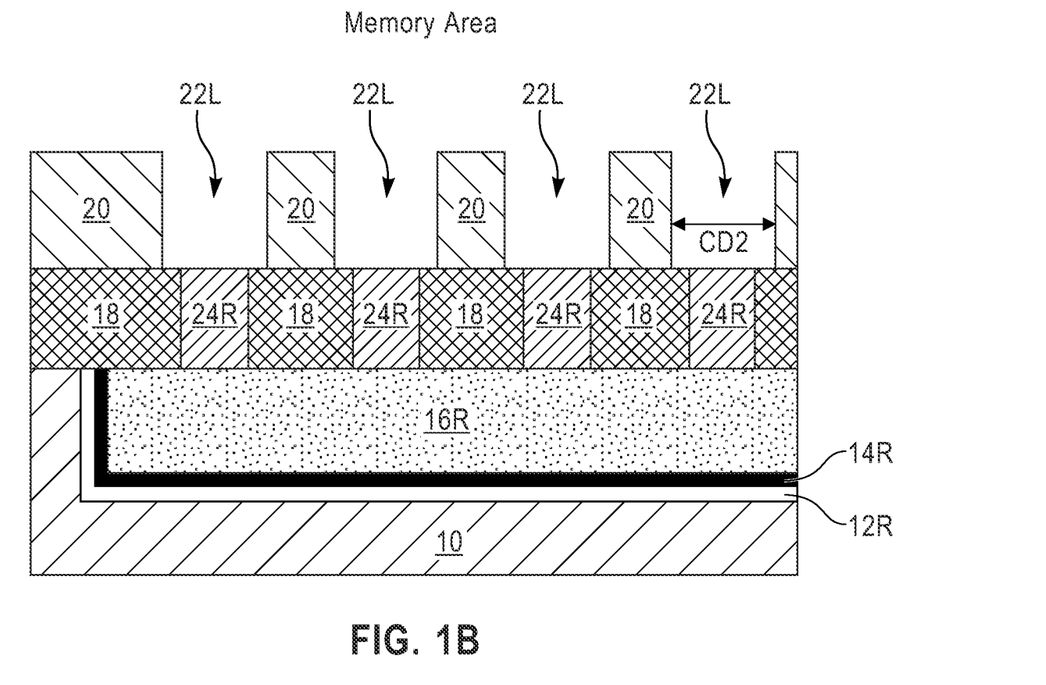
FIG. 1B is a cross sectional view illustrating a memory area of the interconnect structure after forming openings into the third interconnect dielectric material layer.

Referring first to FIGS. 1A and 1B, there are illustrated a PUF area and a memory area, respectively, of an interconnect structure after forming openings 22L, 22R into a third interconnect dielectric material layer 20. It is noted that the PUF area shown in FIG. 1A is an area in which a plurality of PUF structures will be formed, while the memory area is an area in which a plurality of memory structures will be formed.

In the present application, a PUF structure is a structure that includes at least a PUF top electrically conductive structure that contains random sidewall voids and/or random line openings. In some embodiments, each PUF structure includes only the PUF top electrically conductive structure. In other embodiments, each PUF structure includes a memory element sandwiched between a bottom electrically conductive structure and the PUF top electrically conductive structure. When a line opening is present in the PUF top electrically conductive structure, the line opening completely separates a first portion of the PUF top electrically conductive structure from a laterally adjacent second portion of the PUF top electrically conductive structure. When a sidewall void is present, the void is present along a sidewall of the PUF top electrically conductive structure.

In embodiments in which PUF structures include a memory element sandwiched between the bottom electrically conductive structure and the PUF top electrically conductive structure, the bottom electrically conductive structure and the top electrically conductive structure that are present in the PUF area can be composed of an interconnect conductive metal or conductive metal alloy. In other embodiments in which the PUF structures include a memory element sandwiched between the bottom electrically conductive structure and the PUF top electrically conductive structure, the bottom electrically conductive structure and the top electrically conductive structure that are present in the PUF area can be composed of a conductive electrode material.

In the present application, a memory structure is an active (i.e., functional) memory structure in which data can be stored, and retrieved from. The memory structure includes a memory element sandwiched between a bottom electrically conductive structure and a top electrically conductive structure that is devoid of sidewall voids and line openings. In some embodiments of the present application, the bottom electrically conductive structure and the top electrically conductive structure that are present in the memory area can be bottom and top metal-containing interconnect structures, respectively. In other embodiments, the bottom electrically conductive structure and the top electrically conductive structure that are present in the memory area are bottom and top memory electrodes, respectively.

In accordance with the present application, the PUF top electrically conductive structure and the top electrically conductive structure are located in a same interconnect level. Likewise, the memory elements located in the PUF area and memory area are located in a same interconnect level, and the bottom electrically conductive structures in the PUF area and memory area are located in a same interconnect level.

Referring back to FIG. 1A, the PUF area further includes a bottom electrically conductive structure 16L that is embedded in a first portion of a first interconnect dielectric material layer 10. A diffusion barrier liner 12L is located between a sidewall and a bottom wall of the bottom electrically conductive structure 16L. In some embodiments, a metal barrier liner 14L can be located between the sidewall and the bottom wall of the bottom electrically conductive structure 16L and the diffusion barrier liner 12L. In such an embodiment, the metal barrier liner 14L is in direct physical contact with the bottom electrically conductive structure 16L, while the diffusion barrier liner 12L is in direct physical contact with the first interconnect dielectric material layer 10.

In some embodiments, and as is shown in FIG. 1A, the bottom electrically conductive structure 16L that is present in the first portion of the first interconnect dielectric material layer 10 has a topmost surface that is coplanar with a topmost surface of each of the first interconnect dielectric material layer 10 and the diffusion barrier liner 12L. In some embodiments, and as is also shown in FIG. 1A, the bottom electrically conductive structure 16L has a topmost surface that is coplanar with a topmost surface of each of the first interconnect dielectric material layer 10, the diffusion barrier liner 12L and the metal barrier liner 14L.

As is further shown in FIG. 1A, a stack of a second interconnect dielectric material layer 18 and the third interconnect dielectric material layer 20 is located above the first interconnect dielectric material layer 10 and the bottom electrically conductive structure 16L that is present in the PUF area. The second interconnect dielectric material layer 18 and the third interconnect dielectric material layer 20 that are present in the PUF area, can be referred to as first portions of the second interconnect dielectric material layer 18 and the third interconnect dielectric material layer 20, respectively.

In the illustrated embodiment of FIG. 1A, a plurality of memory elements 24L is embedded in this first portion of the second interconnect dielectric material layer 18. Each memory element 24L has a topmost surface that is in direct physical contact with the topmost surface of the bottom electrically conductive structure 16L and a topmost surface that, at this point of the present application, is bare (i.e., physically exposed). The topmost surface of each of the memory elements 24L can, in some embodiments, be coplanar with a topmost surface of the second interconnect dielectric material layer 18. The first portion of the third interconnect dielectric material layer 20 that is present in the PUF area has a plurality of openings 22L present therein that physically exposes a topmost surface of one of the memory elements 24L. Each of the openings 22L that is located in the PUF area has a first critical dimension, CD1, (i.e., physical width).

In some embodiments (not shown in FIG. 1A), the first interconnect dielectric material layer 10 that is present in the PUF area is devoid of the diffusion barrier liner 12L, the metal liner 14L and the bottom electrically conductive structure 16L, and the second interconnect dielectric material layer 18 that is present in the PUF area is devoid of memory elements 24L. In such an embodiment, the openings 22L would physically expose a surface of the second interconnect dielectric material layer 18 that is present in the PUF area. This embodiment is depicted in the interconnect structure shown in FIG. 6 of the present application.

The memory area shown in FIG. 1B includes a bottom electrically conductive structure 16R that is embedded in a second portion of the first interconnect dielectric material layer 10; the first and second portions of the first interconnect dielectric material layer 10 are laterally adjacent to each other. A diffusion barrier liner 12R is located between a sidewall and a bottom wall of the bottom electrically conductive structure 16R. In some embodiments, a metal barrier liner 14R is located between the sidewall and the bottom wall of the bottom electrically conductive structure 16R and the diffusion barrier liner 12R. In such an embodiment, the metal barrier liner 14R is in direct physical contact with the bottom electrically conductive structure 16R, while the diffusion barrier liner 12R is in direct physical contact with the first interconnect dielectric material layer 10.

In some embodiments, and as is shown in FIG. 1B, the bottom electrically conductive structure 16R has a topmost surface that is coplanar with a topmost surface of both of the first interconnect dielectric material layer 10 and the diffusion barrier liner 12R. In some embodiments, and as is also shown in FIG. 1B, the bottom electrically conductive structure 16R has a topmost surface that is coplanar with a topmost surface of each of the first interconnect dielectric material layer 10, the diffusion barrier liner 12R and the metal barrier liner 14R.

As is further shown in FIG. 1B, the stack of the second interconnect dielectric material 18 and the third interconnect dielectric material 20 is located above the first interconnect dielectric material 10 and the bottom electrically conductive structure 16R that is present in the memory area. The second interconnect dielectric material layer 18 and the third interconnect dielectric material layer 20 that are present in the memory area, can be referred to as second portions of the second interconnect dielectric material layer 18 and the third interconnect dielectric material layer 20, respectively.

A plurality of memory elements 24R is embedded in this second portion of the second interconnect dielectric material layer 18 that is present in the memory area. Each memory element 24R of the plurality of memory elements 24R has a topmost surface that is in direct physical contact with the topmost surface of the bottom electrically conductive structure 16R and a topmost surface that, at this point of the present application, is bare (i.e., physically exposed). The topmost surface of each memory element 24R of the plurality of memory elements 24R can, in some embodiments, be coplanar with a topmost surface of the second interconnect dielectric material layer 18. The third interconnect dielectric material layer 20 that is present in the memory area has a plurality of openings 22R present therein. Each opening 22R of the plurality of openings 24R that are present in the memory area physically exposes a topmost surface of one of the underlying memory elements 24R. The plurality of openings 22R in the memory area has a second critical dimension, CD2 (i.e., physical width) that is greater than the first critical dimension (CD1). Typically, CD2 is at ground rule CD, while CD1 is less than ground rule CD. By "ground rule CD" it is meant the standard critical dimension for the technology node considered for the application. Thus, CD1 is a reduced CD compared to CD2. In some embodiments of the present application, CD2 is from 32 nm to 200 nm, while CD1 is from 16 nm to 28 nm.

The various elements shown in FIGS. 1A and 1B will now be described in greater detail. The first interconnect dielectric material layer 10 (including the first and second portions that are present in the PUF area and the memory area, respectively) is present in the back-end-of-the-line (BEOL) and is formed on a substrate (not shown). The substrate (not shown) can include a lower interconnect level, and/or a middle-of-line (MOL) level and/or a front-end-of-the-line structure. The front-end-of-the-line structure includes a semiconductor substrate that contains a plurality of semiconductor devices formed therein or thereupon. The MOL level includes an MOL dielectric material having at least one contact structure formed therein. The lower interconnect level includes at least one interconnect dielectric material layer having at least one electrically conductive structure embedded therein.

The first interconnect dielectric material layer 10 can be composed of an inorganic dielectric material, an organic dielectric material or a combination of inorganic and organic dielectric materials. In some embodiments, the first interconnect dielectric material layer 10 can be porous. In other embodiments, the first interconnect dielectric material layer 10 can be non-porous. In yet other embodiments, the first interconnect dielectric material layer 10 may include regions that are porous and other regions that are non-porous. Examples of suitable dielectric materials that can be employed as the first interconnect dielectric material layer 10 include, but are not limited to, silicon dioxide, undoped or doped silicate glass, silsesquioxanes, C doped oxides (i.e., organosilicates) that include atoms of Si, C, O and H, theremosetting polyarylene ethers or any multilayered combination thereof. The term "polyarylene" is used in this present application to denote aryl moieties or inertly substituted aryl moieties which are linked together by bonds, fused rings, or inert linking groups such as, for example, oxygen, sulfur, sulfone, sulfoxide, or carbonyl.

The first interconnect dielectric material layer 10 can have a dielectric constant (all dielectric constants mentioned herein are measured relative to a vacuum, unless otherwise stated) that is about 4.0 or less. In one embodiment, the first interconnect dielectric material lay 10 has a dielectric constant of 2.8 or less. These dielectrics generally having a lower parasitic cross talk as compared to dielectric materials whose dielectric constant is greater than 4.0. The first interconnect dielectric material layer 10 can be formed by a deposition process such as, for example, chemical vapor deposition (CVD), plasma enhanced chemical vapor deposition (PECVD) or spin-on coating. The first interconnect dielectric material layer 10 can have a thickness from 50 nm to 250 nm. Other thicknesses that are lesser than 50 nm, and greater than 250 nm can also be employed in the present application as the thickness of the first interconnect dielectric material layer 10.

The diffusion barrier liners 12L, 12R (which can be referred to as bottom diffusion barrier liners) can be composed of any diffusion barrier material the permits another material from diffusing therethrough. Illustrative examples of diffusion barrier materials that can be used as the diffusion barrier liners 12L, 12R include, but are not limited to, Ta, TaN, Ti, TiN, W or WN. In some embodiments, the diffusion barrier liners 12L, 12R can include a material stack of two or more diffusion barrier materials. In one example, the diffusion barrier liners 12L, 12R can be composed of a stack of Ta/TaN or Ti/TiN. In some embodiments, the diffusion barrier liner 12L that is present in the PUF area is composed of a same diffusion barrier material as the diffusion barrier liner 12R that is present in the memory area. In other embodiments, the diffusion barrier liner 12L that is present in the PUF area is composed of a diffusion barrier material that differs from the diffusion barrier material that provides the diffusion barrier liner 12R that is present in the memory area. The diffusion barrier liners 12L, 12R can have a thickness from 2 nm to 50 nm; although other thicknesses for the diffusion barrier liners 12L, 12R are contemplated and can be employed in the present application.

The metal barrier liners 14L, 14R (which can be referred to a bottom metal barrier liners) can be composed of any metal-containing material that aids in adhesion of the conductive material of the bottom electrically conductive structure 16L, 16R. Illustrative examples of metal-containing materials that can be used as the metal barrier liners 14L, 14R, include, but are not limited to, Ru, Co or Rh. In some embodiments, the metal barrier liners 14L, 14R can include a material stack of two or more metal-containing materials. In one example, the metal barrier liners 14L, 14R can be composed of a stack of Ru/Co. In some embodiments, the metal barrier liner 14L that is present in the PUF area is composed of a same metal-containing material as the metal barrier liner 14R that is present in the memory area. In other embodiments, the metal barrier liner 14L that is present in the PUF area is composed of a metal-containing material that differs from the metal-containing material that provides the metal barrier liner 14R that is present in the memory area. The metal barrier liners 14L, 14R can have a thickness from 2 nm to 50 nm; although other thicknesses for the metal barrier liners 14L, 14R are contemplated and can be employed in the present application. Although the drawings of the present application depict metal barrier liners 14L, 14R in both the PUF area and the memory area, the present application contemplates embodiments in which the metal barrier liner 14L, 14R is omitted from either the PUF area or the memory area, but not the other, or embodiments in which the metal barrier liner 14L, 14R is omitted from both of the PUF area and the memory area.

The bottom electrically conductive structures 16L, 16R can serves as either a bottom metal-containing interconnect structure or a bottom memory electrode of a memory structure that further includes a memory element 24L, 24R. When the bottom electrically conductive structures 16L, 16R both serve as a bottom metal-containing interconnect structure, the bottom electrically conductive structures 16L, 16R can be composed of an interconnect conductive metal or conductive metal alloy. Illustrative examples of interconnect conductive materials that can be used in the present application include, Cu, Al, Cu—Al alloy, W, Ru, or Rh. When the bottom electrically conductive structures 16L, 16R both serve as a bottom electrode of a memory structure, the bottom electrically conductive structures 16L, 16R can be composed of a conductive metal or metal alloy such as, for example, Ta, TaN, Ti, TiN, Co, CoWP alloy, CoN, or any multilayer combination thereof. The conductive material that provides the bottom electrically conductive structures 16L, 16R is compositionally different from the diffusion barrier material that provides the diffusion barrier liners 12L, 12R and, in some embodiments, the conductive material that provides the bottom electrically conductive structures 16L, 16R is also compositionally different from the metal-containing material that provides the metal barrier liners 14L, 14R. In some embodiments, the bottom electrically conductive structures 16L that is present in the PUF area is composed of a same conductive material as the bottom electrically conductive structures 16R that is present in the memory area. In other embodiments, the bottom electrically conductive structures 16L that is present in the PUF area is composed of a conductive material that differs from the conductive material that provides the bottom electrically conductive structures 16R that is present in the memory area.

The memory elements 24L, 24R that are employed in the present application include at least one element of a non-volatile memory such as, for example, a ferroelectric memory (FE), a resistive random access memory (ReRAM), a magnetoresistive random access memory (MRAM), or a phase change random access memory (PRAM).

A FE memory is a random access memory similar in construction to a DRAM by using a ferroelectric layer instead of a dielectric layer to achieved non-volatility. FE memories typically include a material stack of, from bottom to top, a bottom electrode, a ferroelectric layer, and a top electrode. Thus, and in one embodiment of the present application in which the bottom electrically conductive structures 16L, 16R and the top electrically conductive structures 30L, 30R (to be subsequently formed) serve as bottom and top electrodes, respectively, of a memory structure, memory elements 24L, 24R can be a ferroelectric layer (i.e., a non-electrode element) that is composed of one or more ferroelectric materials exhibiting ferroelectricity (i.e., a material that has a spontaneous electric polarization that can be reversed by the application of an external electric field). Examples of ferroelectric materials that can be used as the ferroelectric layer include, but not limited to, mixed metal oxides such as, $BaTiO_3$, $Pb(Zr_xTi_{1-x})O_3$ ($0.1 \leq x \leq 1$), or crystalline $HfO_2$ with, or without, a doping element selected from Zr, Al, Ca, Ce, Dy, Er, Gd, Ge, La, Sc, Si, Sr, Sn, C, N, and Y.

In other embodiments, in which in which the bottom electrically conductive structures 16L, 16R and the top electrically conductive structures 30L, 30R (to be subsequently formed) serve as bottom and top metal-containing interconnect structures, respectively, memory elements 24L, 24R include a ferroelectric layer (as defined above) sandwiched between a bottom electrode and a top electrode. In such an embodiment, the bottom electrode is compositionally different from the bottom electrically conductive structures 16L, 16R, and the top electrode is compositionally different from the top electrically conductive structures 30L, 30R (to be subsequently formed). The bottom and top electrodes of a FE memory can be composed of a metal or metal nitride. For example, TiN may be used as the conductive material for the bottom and top electrodes of a FE memory.

A ReRAM device is a random access memory that typically includes a material stack of, from bottom to top, a bottom electrode, a metal oxide that can exhibit a change in electron localization, and a top electrode. Thus, and in one embodiment of the present application, in which the bottom electrically conductive structures 16L, 16R and the top electrically conductive structures 30L, 30R (to be subsequently formed) serve as bottom and top electrodes, respectively, of a memory structure, memory elements 24L, 24R can be a metal oxide (i.e., a non-electrode element). Examples of metal oxides that can be used in a ReRAM device and as memory elements 24L, 24R include oxides of nickel, zirconium, hafnium, iron, or copper.

In other embodiments, in which the bottom electrically conductive structures 16L, 16R and the top electrically conductive structures 30L, 30R (to be subsequently formed) serve as bottom and top metal-containing interconnect structures, respectively, memory elements 24L, 24R include a metal oxide (as defined above) sandwiched between a bottom electrode and a top electrode. In such an embodiment, the bottom electrode is compositionally different from the bottom electrically conductive structures 16L, 16R, and the top electrode is compositionally different from the top electrically conductive structures 30L, 30R, The bottom and top electrodes of a ReRAM can be composed of a metal or metal nitride. For example, TiN may be used as the conductive material of the bottom and top electrodes of a ReRAM.

A MRAM device is a random access memory that includes a magnetic tunnel junction (MTJ) structure. The magnetic tunnel junction (MTJ) structure includes a magnetic reference layer, a tunnel barrier, and a magnetic free layer. In embodiments in which a MRAM device is to be formed, the memory elements 24L, 24R can include at least the MTJ structure (i.e., the magnetic reference layer, the tunnel barrier and the magnetic free layer).

The magnetic reference layer has a fixed magnetization. The magnetic reference layer is composed of a metal or metal alloy that includes one or more metals exhibiting high spin polarization. In alternative embodiments, exemplary metals for the formation of the magnetic reference layer include iron, nickel, cobalt, chromium, boron, and manganese. Exemplary metal alloys may include the metals exemplified by the above. In another embodiment, the magnetic reference layer may be a multilayer arrangement having (1) a high spin polarization region formed from of a metal and/or metal alloy using the metals mentioned above, and (2) a region constructed of a material or materials that exhibit strong perpendicular magnetic anisotropy (strong PMA). Exemplary materials with strong PMA that may be used include a metal such as cobalt, nickel, platinum, palladium, iridium, or ruthenium, and may be arranged as alternating layers. The strong PMA region may also include alloys that exhibit strong PMA, with exemplary alloys including cobalt-iron-terbium, cobalt-iron-gadolinium, cobalt-chromium-platinum, cobalt-platinum, cobalt-palladium, iron-platinum, and/or iron-palladium. The alloys may be arranged as alternating layers. In one embodiment, combinations of these materials and regions may also be employed.

The tunnel barrier of the MTJ structure is composed of an insulator material and is formed at such a thickness as to provide an appropriate tunneling resistance. Exemplary materials for the tunnel barrier include magnesium oxide, aluminum oxide, and titanium oxide, or materials of higher electrical tunnel conductance, such as semiconductors or low-bandgap insulators.

The magnetic free layer of the MTJ structure is composed of at least one magnetic material with a magnetization that can be changed in orientation relative to the magnetization orientation of the reference layer. Exemplary materials for the free layer of the MTJ structure include alloys and/or multilayers of cobalt, iron, alloys of cobalt-iron, nickel, alloys of nickel-iron, and alloys of cobalt-iron-boron.

In some embodiments, in which the bottom electrically conductive structures 16L,16R and the top electrically conductive structures 30L, 30R (to be subsequently formed) serve as bottom and top electrodes, respectively, of a memory structure, memory elements 24L, 24R can be composed of the MTJ structure (i.e., a non-electrode element) defined above. In other embodiments, in which the bottom electrically conductive structures 16L, 16R and the top electrically conductive structures 30L, 30R (to be subsequently formed) serve as bottom and top metal-containing interconnect structure, respectively, memory elements 24L, 24R include the MTJ structure (as defined above) sandwiched between a bottom electrode and a top electrode. In such an embodiment, the bottom electrode is compositionally different from the bottom electrically conductive structures 16L, 16R, and the top electrode is compositionally different from the top electrically conductive structure 30L, 30R, The bottom and top electrodes of a MRAM can be composed of a metal or metal nitride. For example, TiN may be used as the conductive material for the bottom and top electrodes of a MRAM device.

A PRAM device is a random access memory that typically includes a material stack of, from bottom to top, a bottom electrode, a phase change memory material that exhibits a change in atomic order (from crystalline to amorphous or vice versa), and a top electrode. Thus, and in one embodiment of the present application, in which the bottom electrically conductive structures 16L, 16R and the top electrically conductive structures 30L, 30R (to be subsequently formed) serve as bottom and top electrodes, respectively, of a memory structure, memory elements 24L, 24R can be a phase change material (i.e., a non-electrode element) including a chalcogenide glass such as, for example, $Ge_2Sb_2Te_5$ or $Ge_2Bi_2Te_6$.

In other embodiments, in which the bottom electrically conductive structures 16L, 16R and the top electrically conductive structures 30L, 30R (to be subsequently formed) serve as bottom and top metal-containing interconnect structure, respectively, memory elements 24L, 24R include a phase change material (as defined above) sandwiched between a bottom electrode and a top electrode. In such an embodiment, the bottom electrode is compositionally different from the bottom electrically conductive structures 16L, 16R, and the top electrode is compositionally different from the top electrically conductive structures 30L, 30R. The bottom and top electrodes of a PRAM device can be composed of a metal or metal nitride. For example, TiN may be used as the conductive material for the bottom and top electrodes of a PRAM device.

The second interconnect dielectric material layer 18 and the third interconnect dielectric material layer 20 can include one of the interconnect dielectric materials mentioned above for the first interconnect dielectric material layer 10. In some embodiments, the first, second and third interconnect dielectric material layers 10, 18 and 20 are composed of a compositionally same interconnect dielectric material. In other embodiments, at least one of the second or third interconnect dielectric material layers 18, 20 is composed of an interconnect dielectric material that differs compositionally from the first interconnect dielectric material layer 10. For example, the second interconnect dielectric material layer 18 can be composed of a compositionally different interconnect dielectric material than the first and third interconnect dielectric material layers 10, 20. In such an embodiment, the first and third interconnect dielectric materials 10, 20 can be compositionally the same as each other, or compositionally different from each other.

The interconnect level including the first interconnect dielectric material layer 10, the diffusion barrier liners 12L, 12R, the optional metal barrier liners 14L, 14R and the bottom electrically conductive structures 16L, 16R can be formed utilizing processing techniques that are known to those skilled in the art. For example, and after depositing the first interconnect dielectric material layer 10 on a substrate, an opening is formed into each of the PUF area and the memory area. Each opening can be formed by lithography and etching. Next, a layer of the diffusion barrier material, a layer of the metal-containing material (the formation of this layer can be omitted in some embodiments), and a layer of conductive material are formed on a topmost surface of the first interconnect dielectric material layer 10 and within each opening. A material removal process can then be used to remove any material that is present outside the openings and on the topmost surface of the first interconnect dielectric material layer 10. Block mask technology can be used in some embodiments to form a different material (i.e., diffusion barrier, metal-containing, and/or conductive material) in first and second portions of the first interconnect dielectric material layer 10. Block mask technology can also be used to so as to process the first interconnect dielectric material layer 10 that is present in the memory area, while protecting the first interconnect dielectric material layer 10 from being processed in the PUF area.

The memory elements 24L, 24R can be formed by deposition and patterning, and thereafter the second interconnect dielectric material layer 18 can be formed by deposition and planarization. In some embodiments, the second interconnect dielectric material layer 18 can be formed first, and thereafter the memory elements 24L, 24R can be formed into openings that are formed into the second interconnect dielectric material layer 18. Next, the third interconnect dielectric material layer 20 is formed atop the second interconnect dielectric material layer 18 and the memory elements 24L, 24R. In some embodiments, block mask technology can be used to block the PUF area from formation of any memory elements 24L.

Openings 22L, 22R (as defined above) are then formed into the respective device areas of the third interconnect dielectric material layer 20 by lithography and etching. In the present application, a single lithographic mask is used to provide both openings 22L and 22R. The single lithographic mask is designed to have smaller dimensional openings located in one area of the mask, and larger dimensional openings located in another area of the mask. The smaller dimensional openings have a size corresponding to CD1, while the larger dimensional openings have a size corresponding to CD2.

Figure 2A:
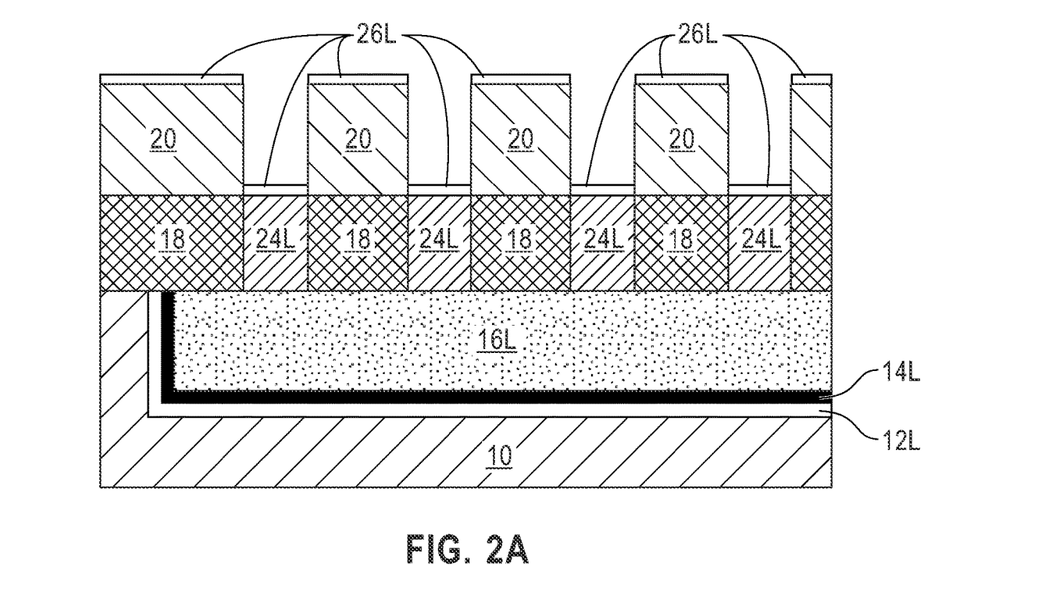
FIG. 2A is a cross sectional view of the PUF area of FIG. 1A after forming a layer of a diffusion barrier material.
Figure 2B:
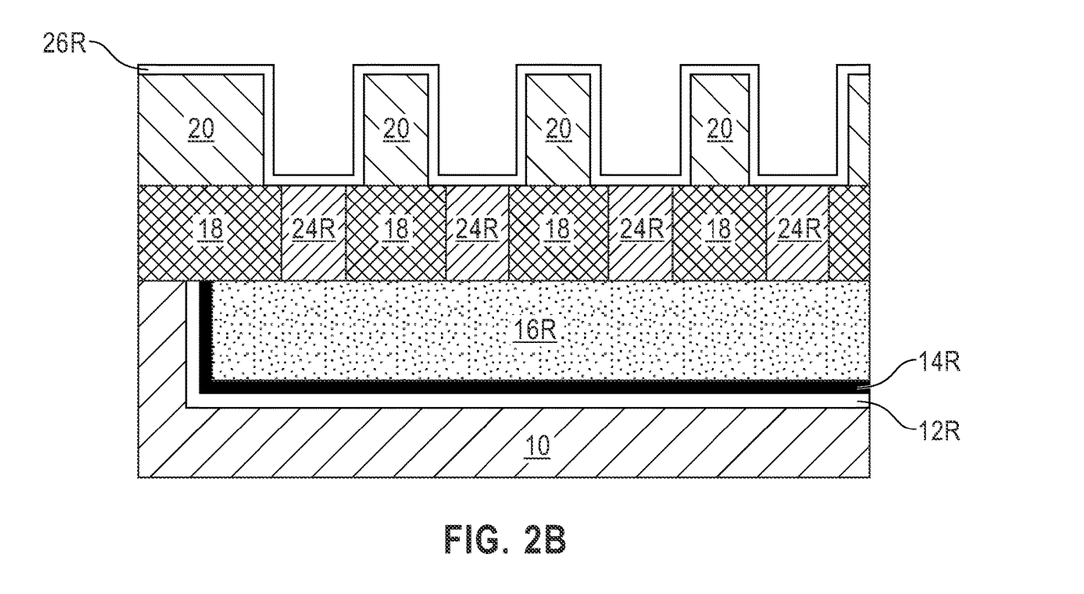
FIG. 2B is a cross sectional view of the memory area of FIG. 1B after forming a layer of a diffusion barrier material.

Referring now to FIGS. 2A and 2B, there are illustrated the interconnect structure shown in FIGS. 1A and 1B respectively, after forming a diffusion barrier layer in each of the PUF area and the memory area. The formation of the diffusion barrier layer in each of the PUF area and the memory area includes depositing one of the diffusion barrier materials mentioned above for the diffusion barrier liners 12L, 12R. The diffusion barrier material used at this point of the present application can be compositionally the same as, or compositionally different from, the diffusion barrier material that provides the diffusion barrier liners 12L, 12R. The depositing of the diffusion barrier material can include PVD, CVD or PECVD.

Due to the reduced critical dimension provided by the openings 22L that are present in the PUF area, poor barrier sidewall coverage occurs in the openings 22L that are present in the PUF area. Notably, and as shown in FIG. 2A, a discontinuous layer of a diffusion barrier material 26L is formed in the PUF area. The discontinuous layer of a diffusion barrier material 26L can be present on a topmost surface of each of third interconnect dielectric material layer 20 and the memory elements 24L that is present in the PUF area. Barrier coverage along the sidewalls of the third interconnect dielectric material layer 20 provided by each opening 22L is poor such that the diffusion barrier material 26L present on the topmost surface of the third interconnect dielectric material layer 20 is not connected to the diffusion barrier material 26L that is present on the topmost surface of the memory element 24L (See, FIG. 2A).

In contrast to the PUF area, and as shown in FIG. 2B, a continuous layer of diffusion barrier material 26R is formed in the memory area. The continuous layer of diffusion barrier material 26R is present on the topmost surface of each of the third interconnect dielectric material layer 20 and the memory element 24R as well as along the entirety of the sidewalls of the third interconnect dielectric material layer 20 provided by each opening 22R.

Figure 3A:
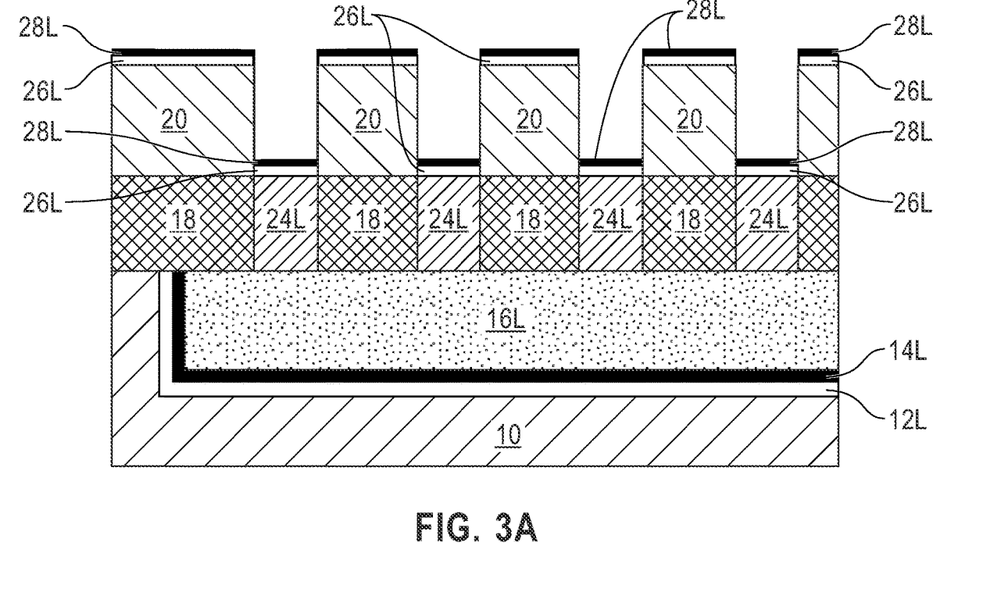
FIG. 3A is a cross sectional view of the PUF area of FIG. 2A after forming a layer of a metal barrier material.
Figure 3B:
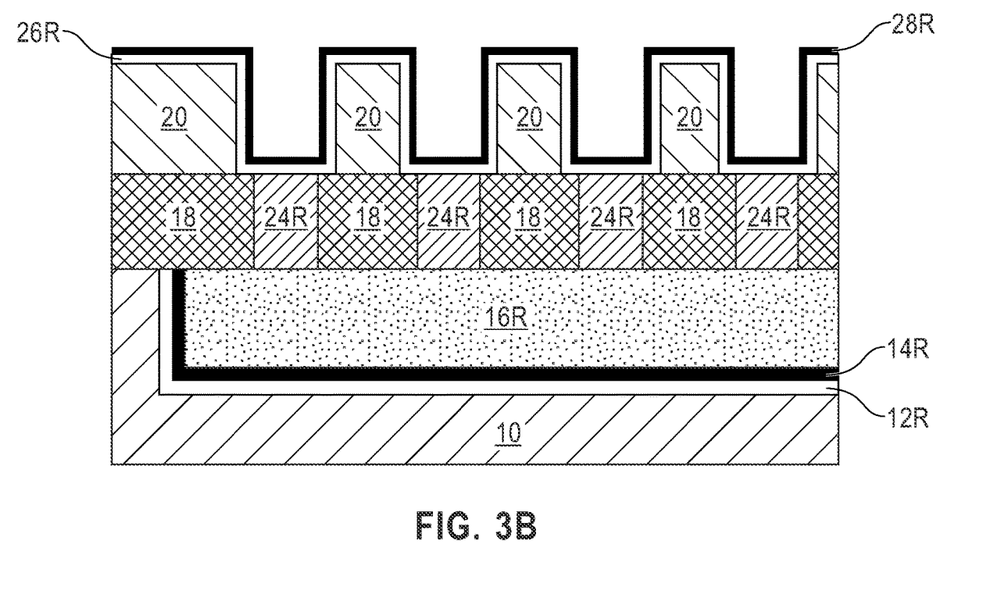
FIG. 3B is a cross sectional view of the memory area of FIG. 2B after forming a layer of a metal barrier material.

Referring now to FIGS. 3A-3B, there are illustrated the interconnect structure shown in FIGS. 2A and 2B respectively, after forming a layer of a metal barrier material. In some embodiments, this step of the present application can be entirely omitted.

The forming of the layer of a metal barrier material in each of the PUF area and memory area includes depositing one of the metal-containing materials mentioned above for the metal barrier liners 14L, 14R. The metal-containing material used to provide the layer of a metal barrier material can be compositionally the same as, or compositionally different from, the metal containing materials that provides the metal barrier liner 14L, 14R. The deposition of the metal-containing material can include PVD, CVD or PECVD.

Due to the reduced critical dimension provided by the openings 22L that are present in the PUF area, poor barrier sidewall coverage occurs in the openings 22L that are present in the PUF area. Notably, and as shown in FIG. 3A, a discontinuous layer of a metal barrier material 28L is formed in the PUF area. The discontinuous layer of a metal barrier material 28L is present on a topmost surface of the discontinuous layer of diffusion barrier material 26L that is present on the topmost surface of both the third interconnect dielectric material layer 20 and the memory elements 24L that is present in the PUF area. Barrier coverage along the sidewalls of the third interconnect dielectric material layer 20 provided by each opening 22L is poor such that the metal barrier material 28L that is located above the topmost surface of the third interconnect dielectric material layer 20 is not connected to the metal barrier material 28L that is present above the topmost surface of the memory element 24L (See, FIG. 3A).

In contrast to the PUF area, and as shown in FIG. 3B, in the memory area a continuous layer of metal barrier material 26L is present above the entirety of the continuous layer of diffusion barrier material 26R.

Referring now to FIGS. 4A-4B and FIGS. 5A-5B, there are illustrated the interconnect structure shown in FIGS. 3A and 3B respectively, after forming a top electrically conductive structure in each of the openings 22L, 22R. Top electrically conductive structure formation includes depositing one of the conductive materials mentioned above for the bottom electrically conductive structures 16L, 16R and then performing a material removal process (such as a planarization process) to remove any material (diffusion barrier material and, if present, metal barrier material) that is located outside the openings 22L, 22R and atop the third interconnect dielectric material layer 20. The deposition of the conductive material may include a metal reflow anneal. The conductive material that is used during top electrode formation can be compositionally the same as, or compositionally different from, the conductive material that provides the bottom electrically conductive structures 16L, 16R.

Figure 4A:
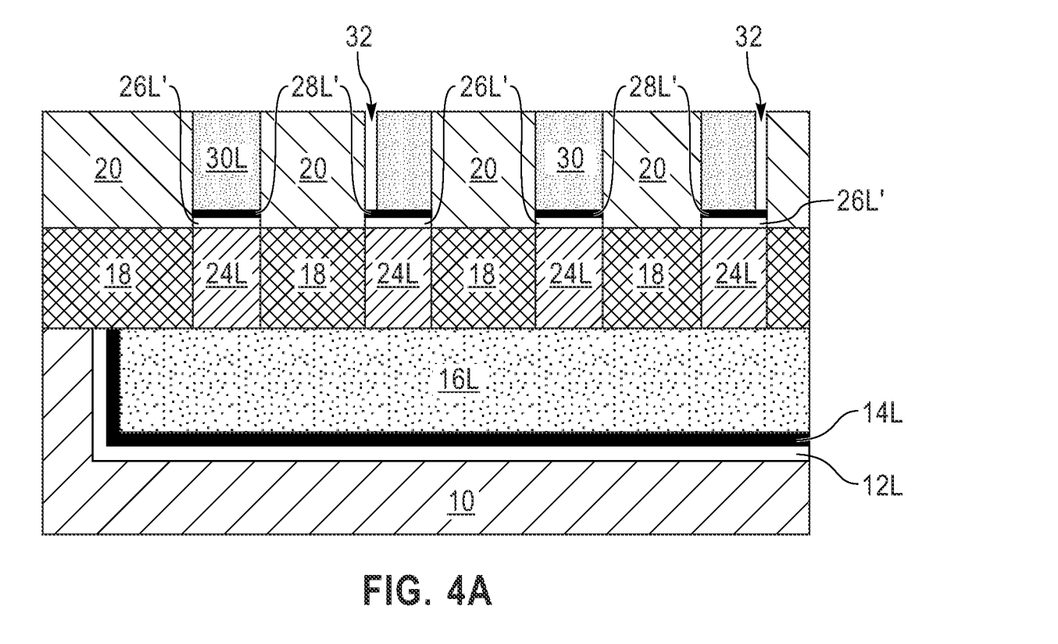
FIG. 4A is a cross sectional view of the PUF area of FIG. 3A after forming a top electrically conductive structure in each of the openings.

Each discontinuous layer of diffusion barrier material 26L that remains in the openings 22L can be referred as a PUF element diffusion barrier liner 26L', and each discontinuous layer of metal barrier material 28L that remains in the openings 22L can be referred as a PUF element metal barrier liner 28L'. The PUF element diffusion barrier liner 26L' and, if present, the PUF element metal barrier liner 28L' are located entirely below a bottommost surface of the PUF top electrically conductive structures 30L that are present in the PUF area.

Figure 4B:
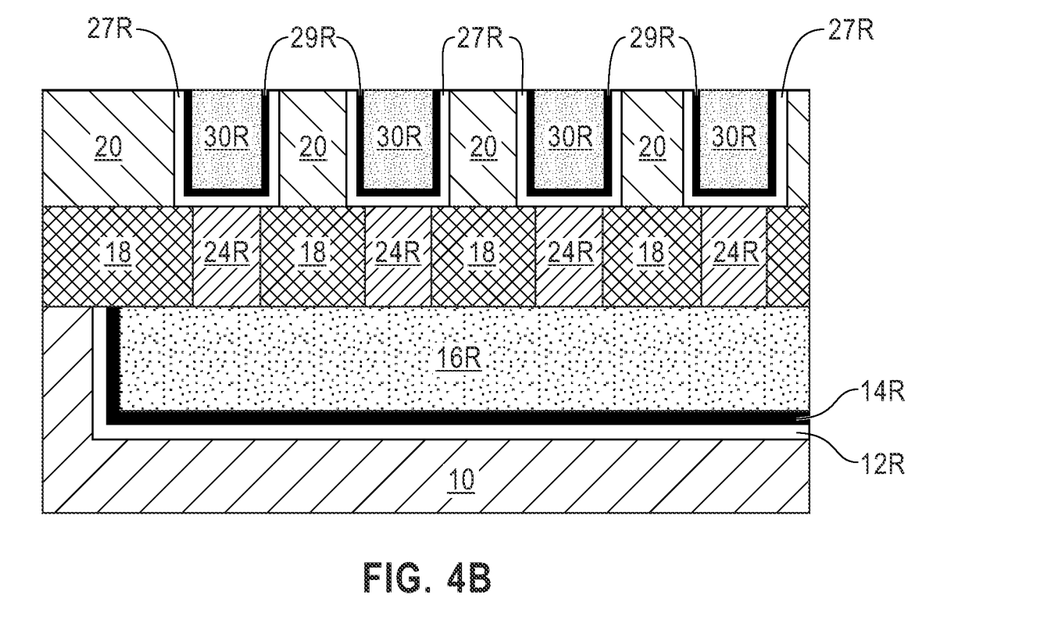
FIG. 4B is a cross sectional view of the memory area of FIG. 3B after forming a top electrically conductive structure in each of the openings.

The portion of the continuous layer of diffusion barrier material 26R that remains in the openings 22R can be referred as a top electrically conductive structure diffusion barrier liner 27R, and the portion of the continuous layer of metal barrier material 28R that remains in the openings 22R can be referred as a top electrically conductive structure diffusion barrier liner 29R. The top electrically conductive structure diffusion barrier liner 27R and the top electrically conductive structure diffusion barrier liner 29R are both U-shaped and each has a topmost surface that is coplanar with each other as well as being coplanar with a topmost surface of each of the third interconnect dielectric material layer 20 and the top electrically conductive structures 30R.

Figure 5A:
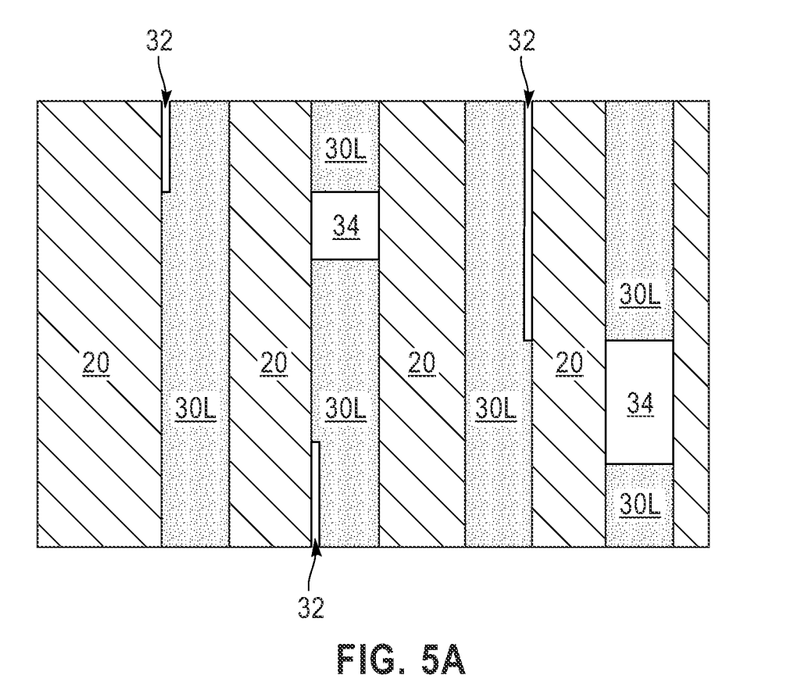
FIG. 5A is a top-down view of the PUF area of FIG. 4A.

After top electrically conductive structure formation and as is shown in FIGS. 4A and 5A, a PUF top electrically conductive structure 30L is formed in each of the openings 22L. Each PUF top electrically conductive structure 30L in the PUF has a first width W1, as measured from an outermost sidewall of the PUF top electrically conductive structure 30L, to opposite outermost sidewall of the same PUF top electrically conductive structure 30L.

The PUF top electrically conductive structures 30L contain random line openings 34, random voids 32 or a combination of random line openings 34 and random voids 32. Poor barrier and/or liner coverage in openings 22L due to the reduced CD of those openings, leads to poor metal adhesion resulting in the random voids 32 and random line openings 34.

The random line openings 34 completely separates one portion of the PUF top electrically conductive structure 30L from another portion of the PUF top electrically conductive structure 30L. PUF top electrically conductive structures 30L containing line openings 34 have a high line resistance as compared to PUF top electrically conductive structures containing sidewall voids 32 along the sidewalls thereof. The randomness of the line openings 34 and sidewall voids 32 in the PUF top electrically conductive structures 30L can provide an encrypted code within the PUF area of the interconnect structure which can be used for identification purposes. The encrypted code can be measured by the manufacturing of the IC by determining the resistance of the various PUF top electrically conductive structures 30L.

Figure 5B:
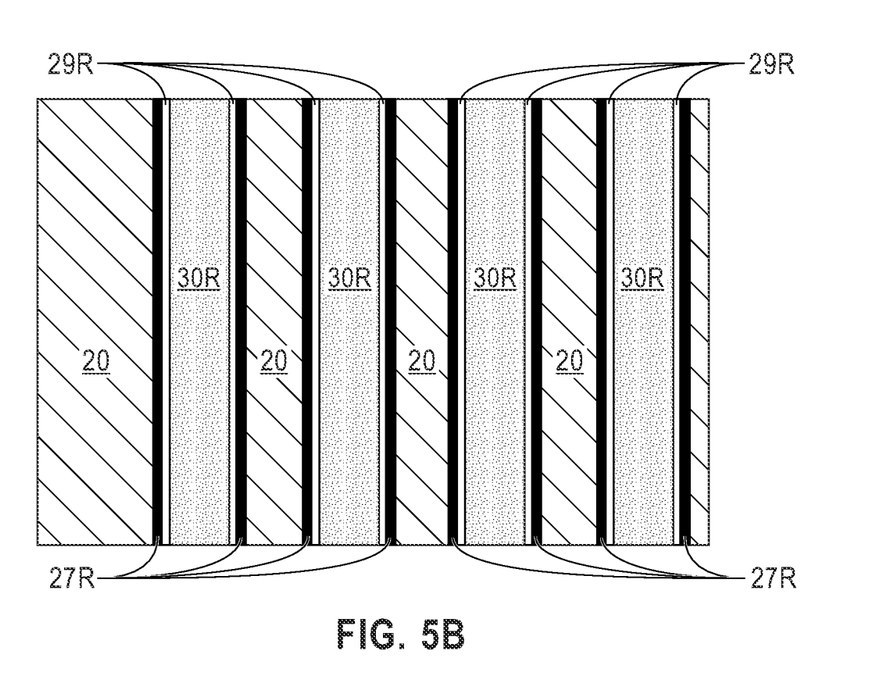
FIG. 5B is a top-down view of the memory area of FIG. 4B.

Top electrically conductive structures 30R in the memory area are devoid of any randomly formed line openings 34 and/or voids 32 since there is adequate sidewall barrier coverage in the openings 22R. The top electrically conductive structures 30R in the memory area can be referred as full metallization regions. Each top electrically conductive structure 30R has a second width W2, as measured from an outermost sidewall of the top electrically conductive structure 30R to opposite outermost sidewall of the same top electrically conductive structure 30R. In accordance with the present, W2 is typically greater than W1.

It is noted that FIGS. 4A, 4B, 5A, 5b and 6 illustrate an IC in accordance with the present application. The IC includes a plurality of physical unclonable function (PUF) structures located in a PUF area, wherein each PUF structure of the plurality of PUF structures comprises at least a PUF top electrically conductive structure 30L containing random sidewall voids 32 and random line openings 34. The IC further includes a plurality of memory structures located in a memory area that is located laterally adjacent to the PUF area. Each memory structure of the plurality of memory structures comprises a memory element 24R sandwiched between a bottom electrically conductive structure 16R and a top electrically conductive structure 30R. In accordance with the present application, the top electrically conductive structure 30R is devoid of sidewall voids 32 and line openings 34.

Figure 6:
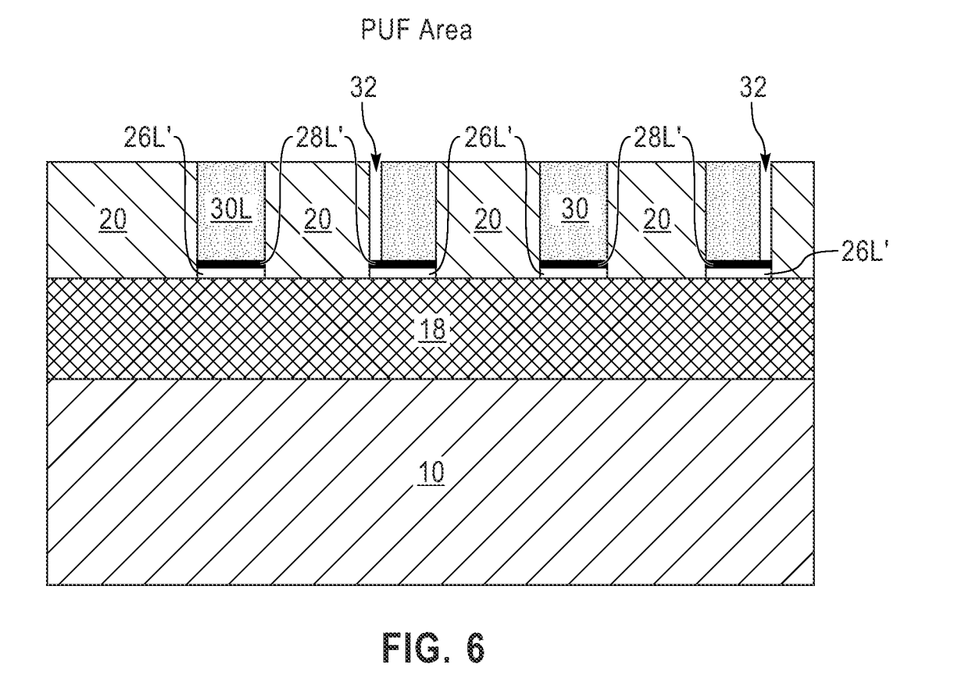
FIG. 6 is a cross sectional view of a PUF area in accordance with another embodiment of the present application.

FIG. 6 illustrates an interconnect structure showing only a PUF area; the PUF area would be located laterally adjacent to the memory area which includes the memory areas shown in FIG. 4B. In this embodiment, none of elements 12L, 14L, 16L are embedded within the first interconnect dielectric material layer 10, and no memory element 24L is the second interconnect dielectric material layer 18. PUF top electrically conductive structures 30L which contain random side voids 32 and random line openings 34 are located in the openings 22L that are formed in the third interconnect dielectric material layer 20. Poor barrier and/or liner coverage in openings 22L due to the reduced CD of those openings, leads to poor metal adhesion resulting in the random voids 32 and random line openings 34. Each of the PUF top electrically conductive structures 30L present in the PUF area includes a stack of a PUF element diffusion barrier liner 26L' and, if present, a PUF element metal barrier liner 28L' located entirely below a bottommost surface of the PUF top electrically conductive structures 30L that are present in the PUF area.

Figure 7:
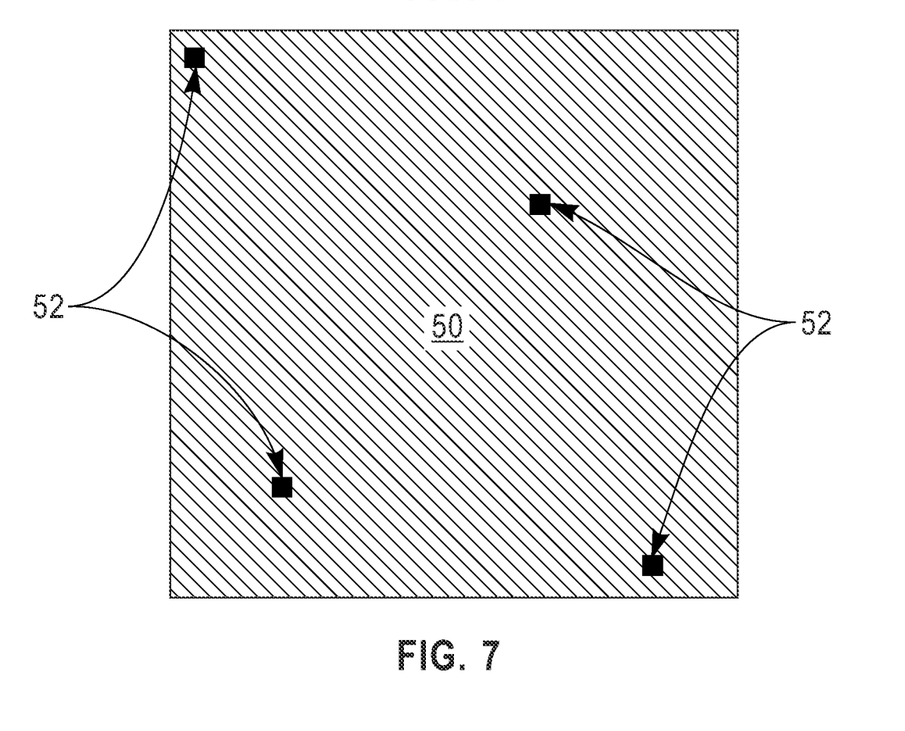
FIG. 7 is a top-down view illustrating an integrated circuit that includes more than one PUF area.

Referring now to FIG. 7, there is provided an illustration of integrated circuit 50 that includes more than one PUF area 52. Each PUF area 52 contains a plurality of PUF structures as defined above.

The terminology used herein is for the purpose of describing particular embodiments only and is not intended to be limiting of the present application. As used herein, the singular forms "a", "an" and "the" are intended to include the plural forms as well, unless the context clearly indicates otherwise. It will be further understood that the terms "comprises" and/or "comprising", when used in this application, specify the presence of stated features, integers, steps, operations, elements, and/or components, but do not preclude the presence or addition of one or more other features, integers, steps, operations, elements, components, and/or groups thereof.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. An integrated circuit comprising:
a plurality of physical unclonable function (PUF) structures located in a PUF area, wherein each PUF structure of the plurality of PUF structures comprises at least a PUF top electrically conductive structure containing random sidewall voids and random line openings; and
a plurality of memory structures located in a memory area that is located laterally adjacent to the PUF area, wherein each memory structure of the plurality of memory structures comprises a memory element sandwiched between a bottom electrically conductive structure and a top electrically conductive structure, wherein each of the top electrically conductive structures is devoid of sidewall voids and line openings.

2. The integrated circuit of claim 1, wherein the PUF area and the memory area are present in a stack of a first interconnect dielectric material layer, a second interconnect dielectric material layer, and a third interconnect dielectric material layer, wherein the PUF top electrically conductive structures and the top electrically conductive structures are embedded in the third interconnect dielectric material layer, the memory element of each of the memory structures is embedded in the second interconnect dielectric material layer, and the bottom electrically conductive structure of each of the memory structures is embedded in the first interconnect dielectric material layer.

3. The integrated circuit of claim 2, wherein each of the PUF top electrically conductive structures is located in an opening in the third interconnect dielectric material layer having a first critical dimension, and each of the top electrically conductive structures is located in another opening present in the third interconnect dielectric material layer having a second critical dimension which is greater than the first critical dimension.

4. The integrated circuit of claim 3, wherein a PUF element diffusion barrier liner is located beneath each PUF top electrically conductive structure, and a U-shaped diffusion barrier liner is located along a sidewall and bottom wall of each top electrically conductive structure.

5. The integrated circuit of claim 4, further comprising a PUF element metal barrier liner located between the PUF element diffusion barrier liner and each of the PUF top electrically conductive structures, and a U-shaped metal liner is located between the U-shaped diffusion barrier liner and each of the top electrically conductive structures.

6. The integrated circuit of claim 2, wherein the PUF structures in the PUF area are devoid of any memory elements in the second interconnect dielectric material layer, and devoid of a bottom electrically conductive structure in the first interconnect dielectric material layer.

7. The integrated circuit of claim 2, wherein each of the PUF structures in the PUF area contains another memory element in the second interconnect dielectric material layer and another bottom electrically conductive structure in the first interconnect dielectric material layer, wherein the another memory element is located beneath one of PUF top electrically conductive structures, and the another memory element in the PUF area is located on a surface of the another bottom electrically conductive structure that is present in the PUF area.

8. The integrated circuit of claim 7, wherein the PUF top electrically conductive structures, the top electrically conductive structures, the another bottom electrically conductive structure in the PUF area and the bottom electrically conductive structure in the memory area are interconnect metal-containing structures.

9. The integrated circuit of claim 8, wherein the memory element is a non-electrode element of a ferroelectric memory (FE), a resistive random access memory (ReRAM), a magnetoresistive random access memory (MRAM), or a phase change random access memory (PRAM), the memory element includes bottom and top electrodes.

10. The integrated circuit of claim 8, wherein the PUF top electrically conductive structures, the top electrically conductive structures, the another bottom electrically conductive structure in the PUF area and the bottom electrically conductive structure in the memory area are conductive metal electrodes.

11. The integrated circuit of claim 10, wherein the memory element is a ferroelectric memory (FE), a resistive random access memory (ReRAM), a magnetoresistive random access memory (MRAM), or a phase change random access memory (PRAM).

12. The integrated circuit of claim 1, wherein the random sidewall voids and the random line openings provide an encrypted code in the PUF area.

13. The integrated circuit of claim 1, wherein the PUF top electrically conductive structures and the top electrically conductive structures are present in a same interconnect level.

14. A method of forming an integrated circuit, the method comprising:
forming an interconnect structure comprising a stack of a first interconnect dielectric material layer, a second interconnect dielectric material layer and a third interconnect dielectric material layer, wherein the stack includes a physical unclonable function (PUF) area and a memory area, wherein the memory area includes a bottom electrically conductive structure embedded in the first interconnect dielectric material layer and a plurality of memory elements embedded in the second interconnect dielectric material layer;
forming openings in the third interconnect dielectric material layer and in both the PUF area and the memory area, wherein each of the openings formed in the PUF area have a first critical dimension and each of the openings forming in the memory area have a second critical dimension that is greater than the first critical dimension;
forming a diffusion barrier layer in each of the PUF area and the memory area, wherein the diffusion barrier layer that is formed in the PUF area is a discontinuous layer of diffusion barrier material that is formed on a topmost surface of the third interconnect dielectric material layer and along a bottom of each of the openings having the first critical dimension and the diffusion barrier layer that is formed in the memory area is a continuous layer of diffusion barrier material that is formed on the topmost surface of the third interconnect dielectric material layer and along a sidewall and bottom of each of the openings having the second critical dimension; and
forming a top electronically conductive structure in each of the openings by deposition of a conductive material and a material removal process, wherein the material removal process removes the discontinuous layer of diffusion barrier material and the continuous layer of diffusion barrier material that are located on the topmost surface of the third interconnect dielectric material layer, wherein the top electrically conductive structure that is present in the openings having the first critical dimension are PUF top electrically conductive structures that contain random sidewall voids and random line openings.

15. The method of claim 14, wherein the forming of the openings comprises using a single lithographic mask having smaller dimensional openings located in one area of the single lithographic mask, and larger dimensional openings located in another area of the single lithographic mask, wherein the smaller dimensional openings have a first size corresponding to the first critical dimension and the larger dimensional openings have a second size corresponding to the second critical dimension.

16. The method of claim 14, wherein the PUF area includes another bottom electrically conductive structure embedded in the first interconnect dielectric material, and a plurality of other memory elements embedded in the second interconnect dielectric material layer and located on the another electrically conductive structure.

17. The method of claim 16, wherein the PUF top electrically conductive structures, the top electrically conductive structures, the another bottom electrically conductive structure in the PUF area and the bottom electrically conductive structure in the memory area are interconnect metal-containing structures.

18. The method of claim 17, wherein the memory element of each of the memory structures is a ferroelectric memory (FE), a resistive random access memory (ReRAM), a magnetoresistive random access memory (MRAM), or a phase change random access memory (PRAM), the memory element includes bottom and top electrodes.

19. The method of claim 16, wherein the PUF top electrically conductive structures, the top electrically conductive structures, the another bottom electrically conductive structure in the PUF area and the bottom electrically conductive structure in the memory area are conductive metal electrodes.

20. The method of claim 19, wherein the memory element is a non-electrode element of a ferroelectric memory (FE), a resistive random access memory (ReRAM), a magnetoresistive random access memory (MRAM), or a phase change random access memory (PRAM).

* * * * *